Figure 1:
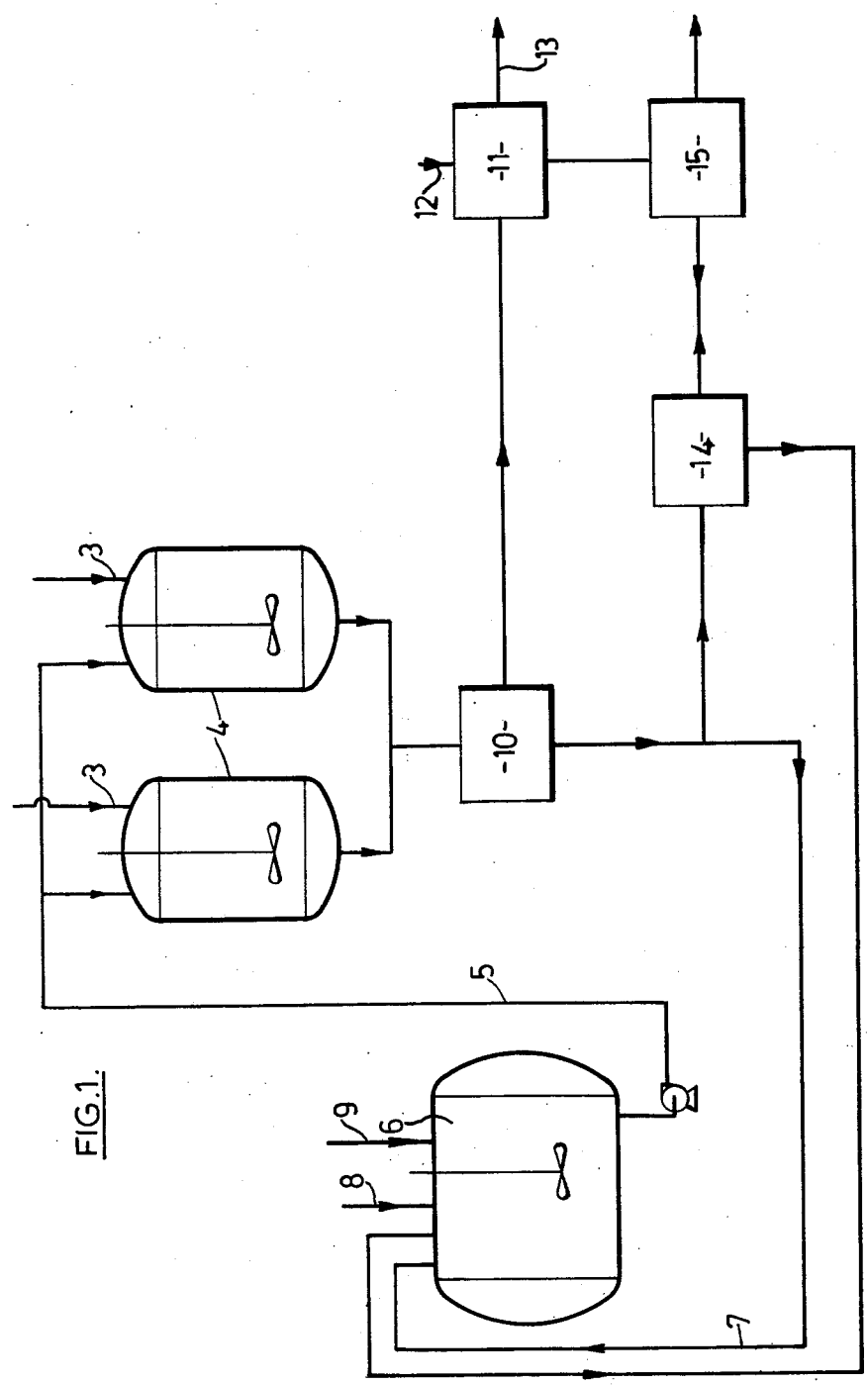

United States Patent [19]

Brasey et al.

[11] 4,100,341

[45] Jul. 11, 1978

[54] URONIC OXIDATION OF CELLULOSE

[75] Inventors: Marcel Brasey; Alfred D. Schweizer; James C. Shorrock, all of Geneva, Switzerland

[73] Assignee: Gallaher Limited, Belfast, Northern Ireland

[21] Appl. No.: 449,058

[22] Filed: Mar. 7, 1974

[30] Foreign Application Priority Data

Mar. 29, 1973 [GB] United Kingdom ............... 15188/73

[51] Int. Cl.² ...................... C08B 15/02; C08B 15/04
[52] U.S. Cl. .................................... 536/56; 8/116 R; 131/2; 162/81
[58] Field of Search ................. 162/81, 70; 131/2; 260/212; 536/30, 56; 8/116 R

[56] References Cited

U.S. PATENT DOCUMENTS

| 29,059 | 7/1860 | Clemo ..................... 162/81 |
| 1,923,292 | 8/1933 | Bassett .................... 162/81 |
| 1,985,609 | 12/1934 | Kipper .................. 162/81 X |
| 2,110,545 | 3/1938 | Dreyfus ................... 162/81 |
| 2,256,391 | 9/1941 | Hiatt ..................... 260/212 |
| 2,299,132 | 10/1942 | Dreyfus ............... 162/81 X |
| 2,472,591 | 6/1949 | Kenyon et al. ......... 260/212 X |
| 2,539,093 | 1/1951 | Mainguet ............. 162/81 X |
| 2,597,430 | 5/1952 | Baudiniere ............. 162/81 |
| 3,007,917 | 11/1961 | Pauling .................. 260/212 |
| 3,253,977 | 5/1966 | Desforges et al. ....... 162/81 |
| 3,364,200 | 1/1968 | Ashton et al. ......... 260/212 |

*Primary Examiner*—Arthur L. Corbin
*Attorney, Agent, or Firm*—Brisebois & Kruger

[57] ABSTRACT

Uronic oxidation of cellulose is achieved by reacting cellulose with aqueous nitric acid containing nitrogen dioxide.

11 Claims, 2 Drawing Figures

URONIC OXIDATION OF CELLULOSE

Much work has been done on the preparation of oxycellulose of the polyanhydroglucuronic acid type, that is cellulose in which all or a fraction of the —CH$_2$OH groups in the C$_6$ position have been oxidised to carboxyl groups. The types of products are useful in many fields, for example as a haemostatic agent, for photographic papers, as an ion exchange material and as a substitute for tobacco in smoking materials. The value of the oxidised cellulose as a substitute for tobacco lies in the fact that its smoke chemistry is simpler and more predictable than that of natural tobacco, with a corresponding reduction in components which are considered to be possible health hazards. Moreover previous work has shown oxycellulose to burn with a very bland neutral taste and smell which is a prerequisite for a base material for a tobacco substitute.

Although numerous methods have been proposed for the uronic oxidation of cellulose and satisfactory products have resulted, the known methods involve an excessive treatment steps preventing them from being reduced to a cheap industrial process. For example, for the degree of uronic oxidation to amount to 90% or more of the theoretical value this has in some processes required a treatment time of up to a week.

In other processes the oxidation has not been sufficiently specific to uronic oxidation, and non-uronic carboxyl groups have been introduced. In other cases for example, ketone group formation has taken place at the C$_2$ and/or C$_3$ positions. This secondary oxidation gives the oxidised cellulose poor stability and its colour and physical properties deteriorate unacceptably. To combat this problem it has been necessary to treat such product with a reducing agent, such as sodium borohydride. This step not only requires the use of additional reactants, additional time, and additional equipment, but necessitates subjecting the product to further washing steps to remove sodium and boron from the product.

A further disadvantage of the existing methods, is that in practice they have used as a starting material cellulose gauze or cellulose paper sheet. This imposes a limitation on the physical characteristics of the oxidised cellulose product and the degrees of freedom available for further processing. For example, when the starting material is a paper web, the expansion of the cellulose upon oxidation causes the width and thickness of the web to vary in a manner which cannot be predicted accurately so that the oxidised product cannot be subjected to subsequent slitting or other treatment requiring precise dimensions.

Other methods based on the use of a mixture of strong acids, for example phosphoric or nitric, and of nitrogen oxide generators such as sodium nitrite, have resulted in some cases in more acceptable reaction times. However, after reaction the presence of these agents or their decomposition products in the mother liquors renders them extremely difficult to recycle and disposal of such noxious chemicals is expensive and hazardous.

Out latest research has been directed to the possible use of a combination of nitric acid and nitrogen oxides as the oxidising agent for the cellulose and we have found that the reaction is very sensitive to changes in the concentration of the reactants. For example, in an 8 h batch reaction on a cotton linters cellulose at 30° C with 15 g of NO$_2$ dissolved in 100 ml of aqueous nitric acid, as the concentration of the aqueous nitric acid increases from 20% to 80% there is a sharp peak of about 95% in the degree of uronic oxidation at approximately 60% concentration on each side of which the degree of oxidation falls away quite sharply. In contrast, the yield, that is the percentage of cellulose which has not been lost by dissolving or destructive oxidation in the reactants and which therefore contributes to the final product, remains comparatively steady at over 90% until the concentration of nitric acid reaches 50%, after which it drops steeply to a trough of about 20% at a nitric acid concentration of 60%, rising steeply to a peak of approximately 90% at a nitric acid concentration of 68.5% from which it drops away again to a nil yield at a nitic acid concentration of 80% or more. This surprising behaviour indicates that if one selects a nitric acid concentration in bands above and below the 60% concentration at which the oxidation is at a maximum and the yield is a minimum, a satisfactory compromise on both oxidation and yield can be achieved. From our experiments to date, we believe that such bands exist between a nitric acid concentration of 35% and 55% (band 1), and between a nitric acid concentration of 60% and 75% (band 2). However, in order to take the fullest advantage of the precise selection of nitric acid concentration to be used, the other reaction conditions must also be defined fairly precisely.

In accordance with the present invention cellulose is subjected to a uronic oxidation by reacting at least 100 ml. of oxidising reactant with each 40 g. of cellulose either (a) a temperature of between 20° C and 60° C (preferably 40° C), the oxidising reactant consisting of aqueous nitric acid at a concentration of between 35% and 55% (preferably between 45% and 55% with a most preferred value at 50%), containing between 5 g. and 50 g. (preferably 24 g.) of nitrogen dioxide per 100 ml. of aqueous nitric acid; or, (b) at a temperature of between 20° C and 40 °C (preferably 30° C), the oxidising reactant consisting of aqueous nitric acid at a concentration of between 60% and 75% (preferably 67.5%), containing between 5 g. and 30 g. (preferably 15 g.) of nitrogen dioxide per 100 ml. of aqueous nitric acid.

The cellulose concentration may be up to 40 g. per 100 ml. of oxidising reactant, that it up to 40%, without appreciably affecting the oxidising reaction since the oxidising reactant is in excess. However, if the cellulose concentration is above say 10%, the reaction mix has a very high consistency requiring special equipment for pumping, handling and stirring of the mix. If the cellulose concentration is below say 3%, the process becomes uneconomical. The preferred range of cellulose concentration is therefore between 3 and 10%, that is between 3 g. and 10 g. of cellulose per 100 ml. of oxidising reactant with a preferred value at 7 g. At these concentrations of cellulose the mix can be handled using normal chemical equipment and the throughput is high enough for economic commercial operation. However on an industrial scale it may be even more economic to carry out the reaction in special high consistency pulping equipment in which case concentrations of up to 40% could be used.

The preferred limitations in the temperature and nitrogen dioxide ranges under both band 1 and band 2 conditions represent a compromise between reaction rate (lower limit) and yield (higher limit). As previously suggested, the preferred limitations in the ranges of nitric acid used reflect improvement in the compromise between oxidation rate and yield.

As explained, both sets of alternative reaction conditions in accordance with the invention optimise the inevitable compromise between uronic oxidation rate and yield. Under band 1 conditions, that is to say using a nitric acid concentration between 35% and 55%, a yield of approximately 100% by weight and a uronic oxidation as high as 75% after as short a reaction time as six hours, and substantially 100% after eight hours, can be achieved. Naturally, 100% oxidation is not required for all purposes and the reaction time can be reduced accordingly. Similarly under band 2 conditions, that is working in the nitric acid concentration range of between 60% and 75%, a yield as high as 90% by weight and uronic oxidation of 77% after as short a reaction time as eight hours, and substantially 100% after 24 hours, can be achieved.

Of the two ranges of reaction conditions, those within band 1, that is to say within the nitric acid range of between 35% and 55%, compared with the band 2 conditions, have some advantages. Thus the reaction is faster, is less sensitive to small variations in reaction conditions, produces a higher yield, results in less physical and chemical degradation of the cellulose, and has less recycling problems for the oxidising reactant, that is to say there is less contamination of the mother liquors when the process is carried out on an industrial scale with recycle. One disadvantage is that the equilibrium pressure of nitrogen oxides over the reaction mixture is higher owing to the generally higher concentration of nitrogen dioxide and the higher reaction temperature, with a result that the reaction takes place under a slight overpressure but this is unimportant on an industrial scale.

The oxidation in accordance with the invention is found to be highly specific to uronic oxidation and secondary oxidation in the $C_2$ and $C_3$ positions has not been detected. The product is therefore stable without the need for subsequent reduction steps or the introduction of further reactants from which the oxidised cellulose has to be purged. All that is necessary is to subject the oxidised cellulose to a simple washing with demineralised water to wash out any nitrogen compounds. In one example the uronic carboxyl content of the oxidised product was found to be 420 meq/100 g; the free carboxylic acid content was 370 meq/100 g; and the nitrogen content 0.2%. Thus it can be seen that some of the uronic groups are internally or externally esterified.

A particular advantage of the new method is that it can be carried out on cellulosic pulp. Many high $\alpha$-cellulose pulps are suitable although we prefer to use a high molecular weight, high crystallinity pulp derived from cotton linters or wood. A moisture content of up to 6 or even 12% in the pulp is quite acceptable and even beneficial to the oxidising reaction.

The advantage of oxidising the cellulose in the form of pulp, that is a fibrous dispersion, is that after oxidation the fibrous and bonding character is retained and the oxidised cellulose can be made into a paper of precise dimensions, porosity, substance and density using a conventional paper making technique, such as on a Fourdrinier machine.

The oxidised cellulose product, particularly in sheet form burns well and may be cut to form a substitute tobacco after the addition of nicotine or tobacco extract or other flavourings as appropriate. Although the material burns well it may be desirable to impregnate the oxidised cellulose with a glow sustaining agent, such as potassium oxalate, or to incorporate an ashing constituent, such as calcium or magnesium oxalate or phosphate. Such materials can be incorporated in the oxidised cellulose after the oxidising process or directly during the sheet-forming process. The preferred method for carrying out this mineralisation step involves firstly the preparation of the relevant salt by neutralisation with the corresponding base or by ion exchange with the soluble salt of a weak acid for example, calcium barium or magnesium acetate or bicarbonate and then by precipitation within the fibres themselves of the mineralising agent by treatment with a solution of the corresponding acid, for example with phosphoric acid to precipitate the insoluble phosphate or with oxalic acid to precipitate the insoluble oxalate. An important advantage of this process is that the fibres contain the mineralising agent intimately in their interior and moreover they maintain sufficient bonding properties to be made up in sheets and webs using paper making methods such as the Fourdrinier machine without losing appreciable quantities of mineralising agent and without the use of a binder.

The fibrous structure of the oxidised cellulose produced by our process and its pulp like bonding properties lend it to a multitude of possible applications other than as a tobacco substitute. The advantages of having an ion exchange material in a fibrous form have been recognised for continuous ion exchange applications (see Chemical Engineering — January 1973, page 60). Even for fixed bed applications, e.g. the recovery of precious metals for example the fibrous structure through which aqueous solutions can easily percolate are clearly preferable to a powdered ion exchanger.

The fibrous form of the oxycellulose as produced by our process, does not preclude its use in other forms. It can be ground to a fine powder for incorporation for example into detergents as a dirt carrier and substitute carboxymethyl cellulose, a more expensive material. It could also be dissolved in certain solutions such as weak alkali and regenerated in the form of films or membranes for use in dialysis, osmosis or other membrane processes.

The method is particularly appropriate for scaling up to mass production either as a batch or continuous process. The only raw materials that are consumed are cellulose pulp, water and nitric acid, the latter being required to make up for losses of nitric acid and nitrogen oxides rather than being incorporated in the final product. Some nitric oxide may be required for start up and make up during operation of the process.

The essential process operations are reduced to an oxidation reaction followed by separation of the oxycellulose and washing. The mother liquors are essentially composed of nitric acid and nitrogen dioxide in complex chemical equilibrium with reduction products of the oxycellulose reaction such as lower nitrogen oxides and acids; and also some dissolved cellulose. They can be recycled and reused after suitable treatment to readjust acid concentration, oxidation potential and dissolved cellulose content to acceptable values. It is probable that sufficient nitrogen dioxide will be generated in this recycle treatment to operate the process and that the only raw materials that will have to be brought in from the outside will be cellulose, nitric acid and water.

Figure 2:
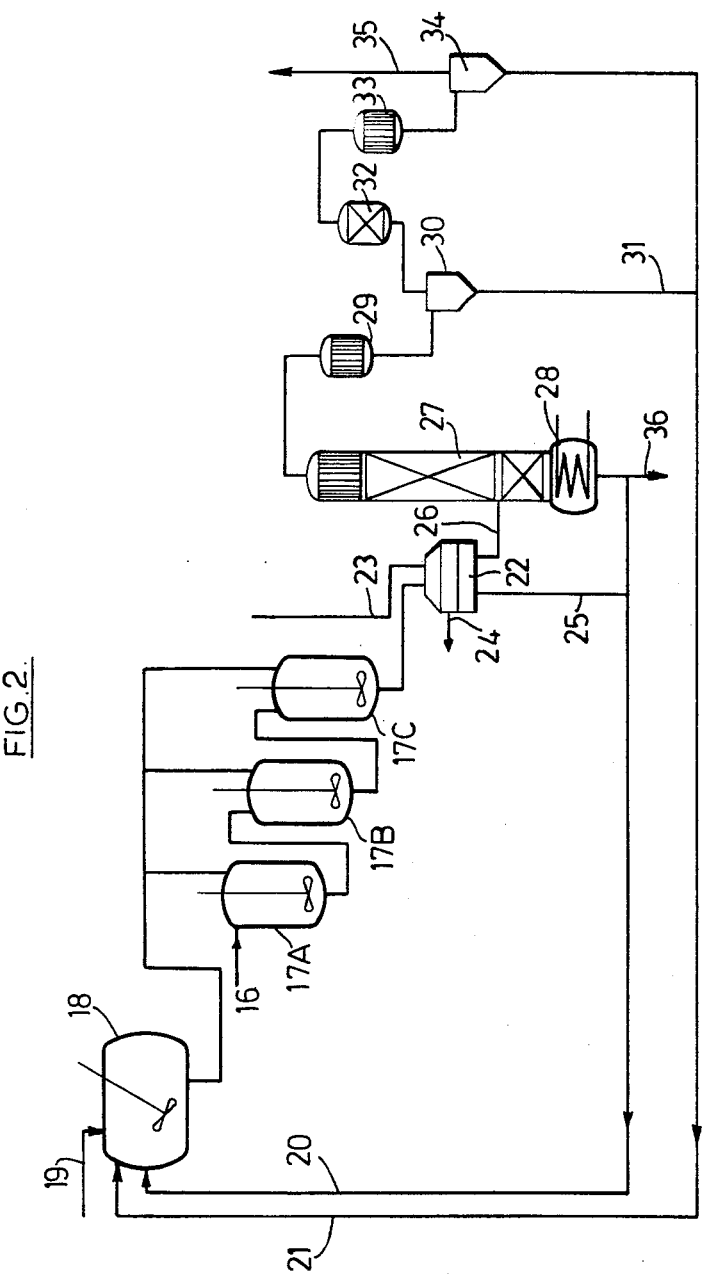

The attached diagrams illustrate two examples of plant for carrying out the oxidation process according to the invention on a large scale. FIG. 1 shows a plant for carrying out a batch process using the band 1 range of nitric acid, and FIG. 2 shows a plant for carrying out a continuous process using the band 2 range of nitric acid.

In the FIG. 1 example, the cellulose is charged batchwise at 3 into one of two reactors 4 in turn where it is contacted rapidly with the oxidising reaction medium. This medium is pumped to the reactor 4 through a line 5 from a mixing vessel 6 which is supplied with recycled liquors through a line 7, the concentration of the liquors being made up as necessary by the addition of fresh nitric acid at 8 and nitrogen dioxide at 9.

The reaction proceeds in the reactor 4 for a determined reaction time providing the required characteristics of the product.

The oxidised cellulose product, suspended in the mother liquors, is discharged from the reactor 4 into a separator 10 where the product is separated from the mother liquor to obtain a required consistency of pulp. The separator may be of any type such as filter press, roll press, screw press, rotary drum filter, or centrifuge. The separate product passes to a washer 11 supplied with washing water at 12 and the washed oxycellulose product leaves the washer 11 through an outlet 13 for further processing. The washer 11 may be of any conventional type and in some cases the washer may be combined with a separator 10.

The mother liquors which are separated in the separator 10 pass to one of the lines 7, either being directly recycled to the mixing vessel 6, or through treatment section 14 where a portion of the mother liquor may be treated in order to avoid over-contamination of the recycle system. The contaminated wash waters and nitrous gases pass from the wash section 11 to a treatment section 15 which may be combined with the mother liquor treatment section 14 and then are either reused or suitably disposed of.

In the FIG. 2 example, cellulose is charged through 16 into the first of three reactors 17A, 17B and 17C. In the reactors the cellulose is contacted with reaction medium produced in a mixing vessel 18 supplied with fresh nitric acid at 19, and with recycled mother liquors through line 20 and recycled nitrogen dioxide through a line 21. The reactors 17 are stirred tanks arranged in cascade and the residence times in each reactor are chosen to yield a product of desired characteristics determined by the particular application. Further reaction solution and the agents can be added to the second and third reactors 17B and 17C if it is necessary to adjust the concentrations in each section.

The product suspended in mother liquors is filtered and washed in a device 22 supplied with washing water through a line 23, the washed oxycellulose leaving through an outlet 24 for further processing.

Part of the separated mother liquors are directly recycled through a line 25 and the rest are fed through a line 26 to a continuous reflux condenser 27 fitted with a steam heater 28. The nitrogen oxides and other gases are stripped off in the condenser and condensed in a condenser 29 through which brine or cold water is circulated. The condensed gases are separated in a separator 30, the liquid fraction, essentially nitrogen dioxide, being recycled through a line 31 to the line 21. The non-condensed gases are passed through a converter 32 where the majority of nitrogen monoxide will be oxidised to nitrogen dioxide and condensed in a condenser 33. The condensed nitrogen dioxide is then separated in a separator 34 and recycled through the line 21, the remaining non-condensible gases being discharged from the plant after suitable treatment through a line 35.

In the reflux condenser 27, some of the dissolved cellulose will react with the nitric acid to give nitrogen oxides, carbon dioxides and water. Nitric acid will reflux at its azeotrope of 68% and part of the recycled stream will be removed through a line 36 to receive further treatment such as fractional distillation or neutralisation and discharge in order to prevent too high concentrations of dissolved cellulose and other non-volatile components of the mother liquors building up in the recycled loop.

It should be noted that a further potential advantage of this recycled process based on the purification of the mother liquors by azeotropic refluxing and oxidated destruction and stripping off of volatiles is that small quantities of other non-volatile materials such as inorganic salts, for example potassium or calcium nitrates, or mineral acids such as sulphuric or phosphoric acids could be included in the reaction mixture and will be recycled in the recycle stream. Such salts have been reported to increase catalytically the oxidation rates of similar reactions and could thus improve the economics of the process.

Some examples of the oxidation of cellulose in accordance with the invention and its subsequent treatment will now be described.

EXAMPLE 1

5 kg of a commercial cotton linter supplied by the Buckeye Cellulose Division of Procter & Gamble Ltd. and designated by the trade description 1-AY-500-3 was placed after drying under vacuum at 30° C for 20 hours in a 150 l fully enclosed reactor vessel equipped with an anchor stirrer. The reaction fluid was prepared in a separate vessel by adding 16.5 kg of liquid nitrogen dioxide to 110 l of 67.5% nitric acid and mixing by recirculation through an external loop. The temperature of the reaction fluid was regulated at approximately 20° C and then 100 l was added to the 150 l vessel. The addition time was about two minutes after which the anchor stirrer was started up and after a few minutes the cellulose formed an even and well dispersed suspension in the reaction fluid. The reaction mixture was heated by passing warm water through the reactor jacket and attained 30° C after about half an hour, after which time it was regulated at 30° C ± 1° C until eight hours after the initial contacting of the cellulose and reaction fluid. The suspension of fibres in mother liquors was then run out of the reactor through a drain valve into a basket centrifuge in which the fibres were separated and then washed rapidly with about 100 l of demineralised water. The cake of fibres was then discharged from the centrifuge and suspended in about 200 l of demineralised water for 24 hours, separated again, washed finally with demineralised water and spread out over a large surface in a heated room to dry. The product obtained weighed 4.5 kg and contained 10% of water. It had the following chemical analysis (based on dry weight):

| | | |
|---|---|---|
| Total free acid | 361 | meq/100 g |
| Total uronic groups | 421 | meq/100 g |
| Total aldehyde and ketone groups | 0 | meq/100 g |
| Total combined carbonyl | 92 | meq/100 g |
| Nitrogen | 0.2% | |

EXAMPLE 2

25 kg of oxycellulose prepared by the above method (Example 1) was resuspended in demineralised water, adjusted to a consistency of 0.6% and fed to a small six-inch wide experimental Fourdrinier paper machine. An open web of paper-like material was obtained having the following characteristics:

| Substance: | 100 g/m² |
|---|---|
| Density: | 0.25 g/cc |

Equilibrium moisture content at 65% RH: 14.9%
This sheet material was then cut into strips resembling cut tobacco rag and made up into cigarettes on a conventional cigarette machine.

These cigarettes were smoked and not only gave a bland and neutral taste but also exhibited a low smoke yield relatively to tobacco.

EXAMPLE 3

15 kg of oxycellulose, prepared by the above method (Example 1) were suspended for 2 hours in a 0.17 M solution of calcium acetate in 100% stoichiometric excess. The calcium salt formed was filtered off, washed and resuspended in water to which a 100% stoichiometric excess of oxalic acid was added slowly with stirring and left with sufficient stirring to maintain the suspension for 2 hours after which time the calcium oxalate impregnated fibres were filtered off and thoroughly washed to remove all traces of free oxalic acid.

The resulting pulp was made up to a consistency of 0.6% in demineralised water and passed into a small experimental Fourdrinier machine and transformed to a sheet having the following characteristics:

| Substance | (g/m²) | 97 |
|---|---|---|
| Density | (g/cc) | 0.3 |
| Ash | | 8.3% |

The ash content indicates an increased weight of about 24% on mineralisation due to calcium oxalate loading retained in the fibres even after wet processing into sheet form.

This mineralised sheet was cut into strips resembling tobacco and made up into cigarettes on a conventional cigarette making machine. These cigarettes were smoked yielding about 17.6 mg of tar per 57 mm cigarette smoked to a 5 mm butt. The burning characteristics, pressure drop and density of the cigarette were similar to a normal tobacco cigarette. Moreover their taste and side stream smell was even more neutral and bland than the non-mineralised cigarettes (Example 2).

EXAMPLE 4

5 kg. of a commercial cotton linter supplied by the Buckeye Cellulose Division of Procter & Gamble Limited and designated by the trade description 1-AY-500-3 was placed in a 250 l fully enclosed reactor vessel equipped with a stirrer. The reaction fluid was prepared in a separate vessel by adding 24 kg. of liquid nitrogen dioxide to 100 l of 50.3% nitric acid and mixing by recirculation through an external loop. The temperature of the reaction fluid was regulated at approximately 20° C and then 100 l were added to the 250 l vessel. The addition time was about 2 minutes after which the stirrer was started up and after a few minutes the cellulose formed an even and well dispersed suspension in the reaction fluid. The reaction mixture was heated by passing warm water through the reactor jacket and attained 40° C after about half an hour, after which time it was regulated at 40° C ± 1° C until six hours after the initial contacting of the cellulose and reaction fluid. The final pressure was 2.8 atmospheres absolute. After the suspension had cooled to 20° C the suspension was run out of the reactor through a drain valve into a basket centrifuge in which the fibres were separated and then washed rapidly with about 400 l of demineralised water. The cake of fibres was then discharged from the centrifuge and collected in wet pulp form (containing 35% dry matter). Hand sheets were then made from a sample of the wet pulp. These sheets have the following chemical analysis (based on dry weight):

| Total free acid | 404 meq/100 g |
|---|---|
| Total uronic groups | 410 meq/100 g |
| Total aldehyde and ketone groups | 0 meq/100 g |
| Total combined carbonyl | 85 meq/100 g |
| Nitrogen | 0.12% |

Another sample of the wet pulp product from Example 4 was, as in Example 2, made into sheets on a small Fourdrinier machine to obtain a paper-like material which had properties similar to the product of Example 2. As in Example 2 the paper was then cut into strips resembling cut tobacco rag and made up into cigarettes which also had similar properties to those referred to in Example 2.

We claim:

1. A method of uronic oxidation of cellulose comprising reacting cellulose with at least 100 ml of an oxidizing reactant per 40g of cellulose, said oxidizing reactant selected from the group consisting of
   (a) aqueous nitric acid at a concentration of between 35 and 55% containing between 5g and 50g of nitrogen dioxide per 100 ml of aqueous nitric acid; and,
   (b) aqueous nitric acid at a concentration of between 60 and 75%, containing between 5g and 30g of nitrogen dioxide per 100 ml of aqueous nitric acid, in which the reaction temperature is between 20° and 60° C when oxidizing reactant (a) is used and between 20° and 40° C when oxidizing reactant (b) is used.

2. The method of claim 1, in which said cellulose is reacted at a concentration of between 3 g and 10 g per 100 ml of said oxidizing reactant.

3. The method of claim 2, in which said cellulose is reacted at a concentration of substantially 7 g per 100 ml of said oxidizing reactant.

4. The method of claim 1, in which under conditions (a) said concentration of aqueous nitric acid is between 45% and 55%.

5. The method of claim 1, in which under conditions (a) said reaction occurs at a temperature of substantially 40° C, said concentration of aqueous nitric acid is substantially 50%, and said concentration of nitrogen dioxide is substantially 24 g per 100 ml of aqueous nitric acid.

6. The method of claim 1, in which under conditions (b) said reaction occurs at a temperature of substantially 30° C, said concentration of nitric acid is substantially 67.5%, and said concentration of nitrogen dioxide is substantially 15 g per 100 ml of aqueous nitric acid.

7. The method of claim 1, in which said cellulose is in pulp form.

8. The method of claim 7, in which said oxidized cellulose pulp is made up into a sheet.

9. The method of claim 8, in which mineral salts are incorporated in said oxidized cellulose pulp.

10. The method of claim 1, in which the oxidation reaction occurs at 20°–60° C and said oxidizing reactant comprises aqueous nitric acid having a concentration of between 35 and 55%, containing between 5 and 50 g of nitrogen dioxide per 100 ml of aqueous nitric acid.

11. The method of claim 1, in which the oxidation reaction occurs at 20°–40° C and said oxidizing reactant comprises aqueous nitric acid having a concentration of between 60–75%, containing between 5 and 30 g of nitrogen dioxide per 100 ml of aqueous nitric acid.

* * * * *